US012666323B2

(12) United States Patent
Han et al.

(10) Patent No.: US 12,666,323 B2
(45) Date of Patent: *Jun. 23, 2026

(54) COMMUNICATION METHOD AND APPARATUS

(71) Applicant: Huawei Technologies Co., Ltd., Shenzhen (CN)

(72) Inventors: Feng Han, Shanghai (CN); Yinghao Jin, Boulogne Billancourt (FR); Hong Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

This patent is subject to a terminal disclaimer.

(21) Appl. No.: 17/580,369

(22) Filed: Jan. 20, 2022

(65) Prior Publication Data

US 2022/0225187 A1     Jul. 14, 2022

Related U.S. Application Data

(63) Continuation of application No. 16/580,834, filed on Sep. 24, 2019, now Pat. No. 11,265,779, which is a (Continued)

(30) Foreign Application Priority Data

Mar. 24, 2017     (CN) .......................... 201710185971.1

(51) Int. Cl.
*H04W 36/00*          (2009.01)
*H04W 74/00*          (2009.01)
*H04W 74/0833*        (2024.01)

(52) U.S. Cl.
CPC ..... *H04W 36/0077* (2013.01); *H04W 74/002* (2013.01); *H04W 74/004* (2013.01); *H04W 74/006* (2013.01); *H04W 74/0833* (2013.01)

(58) Field of Classification Search
CPC ........... H04W 36/0077; H04W 74/002; H04W 74/004; H04W 74/006; H04W 74/008;
(Continued)

(56) References Cited

U.S. PATENT DOCUMENTS

2008/0233966 A1     9/2008  Scheim et al.
2010/0296467 A1     11/2010  Pelletier et al.
(Continued)

FOREIGN PATENT DOCUMENTS

CN          101998464 A       3/2011
CN          101998661 A  *    3/2011       ........ H04W 74/0833
(Continued)

OTHER PUBLICATIONS

Chen, "Selection Method and Device of Network Slices," English Machine Translation of Chen (CN 107343306 A), Clarivate Analytics, pp. 1-15 (Year: 2024).*
(Continued)

*Primary Examiner* — Thomas R Cairns
*Assistant Examiner* — Kai Chang
(74) *Attorney, Agent, or Firm* — Leydig, Voit & Mayer, Ltd.

(57)          ABSTRACT

This application discloses a communication method and an apparatus. In a solution of this application, a base station sends, by using dedicated signaling, at least one random access parameter set to a terminal in a connected mode or an inactive mode. The base station receives a random access request of the terminal in a connected mode or an inactive mode. One of the at least one random access parameter set is used in the random access request. In this application, differentiated random access processes may be performed in different scenarios.

18 Claims, 6 Drawing Sheets

Related U.S. Application Data continuation of application No. PCT/CN2018/080336, filed on Mar. 23, 2018.

(58) Field of Classification Search
CPC .. H04W 74/0833; H04W 76/50; H04W 74/50
See application file for complete search history.

(56) References Cited

U.S. PATENT DOCUMENTS

| | | | | |
|---|---|---|---|---|
| 2013/0242730 | A1 | 9/2013 | Pelletier et al. | |
| 2013/0250902 | A1 | 9/2013 | Xu et al. | |
| 2017/0171886 | A1 | 6/2017 | Nabetani et al. | |
| 2017/0367120 | A1* | 12/2017 | Murray | H04W 74/0833 |
| 2018/0035469 | A1 | 2/2018 | Chen et al. | |
| 2018/0077696 | A1* | 3/2018 | Lee | H04W 74/0833 |
| 2018/0206134 | A1* | 7/2018 | Kudo | H04W 24/02 |
| 2018/0270868 | A1* | 9/2018 | Ou | H04W 74/004 |
| 2018/0270869 | A1* | 9/2018 | Tsai | H04W 74/006 |
| 2018/0279186 | A1* | 9/2018 | Park | H04W 36/302 |
| 2018/0279375 | A1* | 9/2018 | Jeon | H04W 72/23 |
| 2019/0028923 | A1* | 1/2019 | Futaki | H04W 74/0833 |
| 2019/0150218 | A1 | 5/2019 | Futaki | |
| 2019/0335511 | A1* | 10/2019 | Liu | H04W 24/10 |
| 2019/0350005 | A1* | 11/2019 | Liu | H04W 68/005 |
| 2020/0037356 | A1* | 1/2020 | Lou | H04W 74/08 |
| 2020/0107246 | A1* | 4/2020 | Henttonen | H04W 48/12 |
| 2020/0275477 | A1* | 8/2020 | Shah | H04W 74/004 |

FOREIGN PATENT DOCUMENTS

| | | | | | |
|---|---|---|---|---|---|
| CN | 102573101 | A | | 7/2012 | |
| CN | 104186010 | A | | 12/2014 | |
| CN | 105764152 | A | | 7/2016 | |
| CN | 105792380 | A | | 7/2016 | |
| CN | 107343306 | A | * | 11/2017 | H04W 48/08 |
| CN | 104429146 | B | | 12/2017 | |
| WO | 2011017281 | A1 | | 2/2011 | |
| WO | 2013047964 | A1 | | 4/2013 | |
| WO | 2016086144 | A1 | | 6/2016 | |

OTHER PUBLICATIONS

Liang, "Method and Device for Determining Failure of Wireless Link," English Machine Translation of Liang (CN 101998661 A), Clarivate Analytics, pp. 1-13 (Year: 2025).*

"Backoff for UEs of different priorities," 3GPP TSG-RAN WG2#61, Sorrento, Italy, R2-080750, pp. 1-3, 3rd Generation Partnership Project, Valbonne, France (Feb. 11-15, 2008).

"PRACH partitioning, access and congestion control Consideration for Network Slicing," 3GPP TSG-RAN WG2 #97, Athens, Greece, R2-1700998, Total 3 pages, 3rd Generation Partnership Project, Valbonne, France (Feb. 13-17, 2017).

"Acquisition and update of system information," 3GPP TSG-RAN WG2 Meeting #85, Prague, Czech Republic, R2-140055, Total 6 pages, 3rd Generation Partnership Project, Valbonne, France (Feb. 10-14, 2014).

"3rd Generation Partnership Project; Technical Specification Group Radio Access Network; Study on Scenarios and Requirements for Next Generation Access Technologies; (Release 14)," 3GPP TR 38.913 V14.1.0, pp. 1-38, 3rd Generation Partnership Project, Valbonne, France (Dec. 2016).

"On Demand SI Request Transmission Mechanism," 3GPP TSG-RAN WG2 Meeting #97, Athens, Greece, R2-1700817, Total 2 pages, 3rd Generation Partnership Project, Valbonne, France (Feb. 13-17, 2017).

"Differentiate access causes in RACH backoff—Further discussion," 3GPP TSG-RAN WG2#61bis, Shenzhen, China, R2-081631, pp. 1-3, 3rd Generation Partnership Project, Valbonne, France (Mar. 31-Apr. 4, 2008).

"3rd Generation Partnership Project; Technical Specification Group Services and System Aspects; Study on Architecture for Next Generation System (Release 14)," 3GPP TR 23.799 V14.0.0, pp. 1-522, 3rd Generation Partnership Project, Valbonne, France (Dec. 2016).

"Consideration on Random Access in NR," 3GPP TSG-RAN2 #97, Athens, Greece, R2-1700962, pp. 1-2, 3rd Generation Partnership Project, Valbonne, France (Feb. 13-17, 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.1.0, pp. 1-317, 3rd Generation Partnership Project, Valbonne, France (Dec. 2016).

"3rd Generation Partnership Project; Technical Specification Group Radio Access Network; Study on New Radio Access Technology; Radio Interface Protocol Aspects (Release 14)," 3GPP TR 38.804 V0.4.0, pp. 1-30, 3rd Generation Partnership Project, Valbonne, France (Nov. 2016).

U.S. Appl. No. 16/580,834, filed Sep. 24, 2019.

* cited by examiner

| E | T | R | R | BI-0 | Byte 1 |
| BI-1 | | | | BI-2 | Byte 2 |
| BI-3 | | | | BI-4 | Byte 3 |

COMMUNICATION METHOD AND APPARATUS

CROSS-REFERENCE TO RELATED APPLICATIONS

This application is a continuation of U.S. application Ser. No. 16/580,834, filed on Sep. 24, 2019, which is a continuation of International Application No. PCT/CN2018/080336, filed on Mar. 23, 2018, which claims priority to Chinese Patent Application No. 201710185971.1, filed on Mar. 24, 2017. All of the afore-mentioned patent applications are hereby incorporated by reference in their entireties.

TECHNICAL FIELD

The present invention relates to the field of wireless communications technologies, and in particular, to a communication method and an apparatus.

BACKGROUND

The 5th generation mobile communications technology (5G) supports various types of network deployment and application types, for example, supports an application scenario for the Internet of Vehicles, emergency communication, the Industrial Internet, and the like. Therefore, a 5G communications system requires an access capability with higher rate experience and higher bandwidth, an information exchange capability with lower latency and ultra-reliability, and an access and management capability of a machine type communication (MTC) device with a larger scale and lower costs.

In the 5G communications system, ultra-reliable and low latency communications (URLLC) and enhanced mobile broadband (eMBB) are two key application types and have different service features. For example, from the perspective of latency performance, URLLC requires that user plane latency is limited to 0.5 ms in uplink and downlink, and eMBB requires that the user plane latency is limited to 4 ms in uplink and downlink.

Based on the features of the 5G communications system, a new random access method needs to be defined to meet the requirements of the 5G communications system.

SUMMARY

Embodiments of this application provide a communication method and an apparatus, to meet a requirement of a 5G communications system.

According to a first aspect, a communication method is provided, including: sending, by a base station, a plurality of random access parameter sets to a terminal by using a broadcast message; and receiving, by the base station, a random access request of the terminal, where one of the plurality of random access parameter sets is used in the random access request. In this embodiment, random access may be initiated in a differentiated manner in different scenarios.

Optionally, the plurality of random access parameter sets are a plurality of random access parameter sets corresponding to a plurality of random access groups, and one or more random access groups correspond to one random access parameter set. In this embodiment, a corresponding random access parameter set may be set based on a random access group. Further, adapted random access parameter sets may be provided in different scenarios (for example, a service type or a network slice) based on a correspondence between a random access group and a service type, a network slice, or the like.

Optionally, the plurality of random access parameter sets include a random access parameter set corresponding to a default random access group. In this embodiment, it may be ensured that one random access group is matched, so as to ensure execution of random access.

Optionally, the random access parameter set further includes a random access preamble sequence. The random access request includes the random access preamble sequence. After the base station receives the random access request sent by the terminal, the method further includes: returning, by the base station, a random access response message to the terminal, where the random access response message includes indication information of an uplink resource allocated to the terminal, the uplink resource is allocated by the base station based on a scheduling message size threshold value corresponding to a random access group, and the random access group is a random access group corresponding to the random access preamble sequence sent by the terminal. In this embodiment, an uplink resource may be allocated to the terminal based on a random access group corresponding to the terminal, to meet different requirements for the uplink resource in different scenarios (the random access group may be used to distinguish between scenarios).

Optionally, after the base station receives a random access request sent by the terminal, the method further includes: returning, by the base station, the random access response to the terminal, where the random access response includes a plurality of random backoff indicators corresponding to a plurality of random access groups. In this embodiment, random backoff indicators corresponding to different random access groups may be sent to the terminal for selection, to meet a requirement for random backoff or a random access latency or reliability in different scenarios (the random access group may be used to distinguish between scenarios).

According to a second aspect, a communication method is provided, including:

sending, by a base station by using dedicated signaling, at least one random access parameter set to a terminal in a connected mode or an inactive mode; and receiving, by the base station, a random access request of the terminal in a connected mode or an inactive mode, where one of the at least one random access parameter set is used in the random access request, and the random access parameter set includes monitoring start time and/or a time window size of a random access response time window: In this embodiment, when the base station sends a plurality of random access parameter sets, random access may be initiated in a differentiated manner in different scenarios: in addition, when the base station sends one random access parameter set, because the random access parameter set includes the monitoring start time and/or the time window size of the random access response time window; the monitoring start time and/or the time window size of the random access response time window may be provided when the terminal in a connected mode or an inactive mode performs random access.

Optionally, the random access parameter set further includes a random access preamble sequence. The random access request includes the random access preamble sequence. After the base station receives the random access request of the terminal in a connected mode or an inactive mode, the method further includes: returning, by the base station, a random access response to the terminal, where the random access response includes indication information of an uplink resource allocated to the terminal, the uplink resource is allocated by the base station based on a scheduling message size threshold value corresponding to a random access group, and the random access group is a random access group corresponding to the random access preamble sequence sent by the terminal. In this embodiment, an uplink resource may be allocated to the terminal based on a random access group corresponding to the terminal, to meet different requirements for the uplink resource in different scenarios (the random access group may be used to distinguish between scenarios).

Optionally, after the base station receives the random access request of the terminal in a connected mode or an inactive mode, the method further includes: returning, by the base station, the random access response to the terminal, where the random access response includes a plurality of random backoff indicators corresponding to a plurality of random access groups, logical channels, or logical channel groups. In this embodiment, random backoff indicators corresponding to different random access groups, logical channels, or logical channel groups may be sent to the terminal for selection, to meet a requirement for random backoff or a random access latency or reliability in different scenarios (the random access group, logical channel, or logical channel group may be used to distinguish between scenarios).

Optionally, the at least one random access parameter set is one random access parameter set. Alternatively, the at least one random access parameter set is a plurality of random access parameter sets corresponding to a plurality of random access groups. One or more random access groups correspond to one random access parameter set. Alternatively, the at least one random access parameter set is a random access parameter set corresponding to a plurality of logical channels or logical channel groups. One or more logical channels or logical channel groups correspond to one random access parameter set. This embodiment provides a plurality of optional solutions, so that a random access parameter set can correspond to a random access group, a logical channel, or a logical channel group, and corresponding solutions can be used for different requirements, thereby improving system flexibility.

Optionally, the random access parameter set further includes one or any combination of the following parameters: indication information of a random access preamble sequence: indication information of a time-frequency resource occupied by the random access preamble sequence: a timing time length of a contention resolution timer: a maximum quantity of random access times; and a scheduling message size threshold. This embodiment provides a plurality of solutions for parameters included in the random access parameter set, and corresponding solutions can be used for different requirements, thereby improving system flexibility.

According to a third aspect, a communication method is provided, including:

receiving, by a terminal, a plurality of random access parameter sets sent by a base station by using a broadcast message; and sending, by the terminal, a random access request to the base station by using one of the plurality of random access parameter sets.

Optionally, the plurality of random access parameter sets are a plurality of random access parameter sets corresponding to a plurality of random access groups, and one or more random access groups correspond to one random access parameter set.

Optionally, the plurality of random access parameter sets include a random access parameter set corresponding to a default random access group.

Optionally, after the sending a random access request to the base station, the method further includes: receiving, by the terminal, a random access response returned by the base station, where the random access response includes a plurality of random backoff indicators corresponding to the plurality of random access groups: determining, by the terminal, a corresponding random access group based on a random access event, and selecting, based on the determined random access group, a corresponding random backoff indicator from the plurality of random backoff indicators corresponding to the plurality of random access groups.

According to a fourth aspect, a communication method is provided, including:

receiving, by a terminal in a connected mode or an inactive mode, at least one random access parameter set sent by a base station by using dedicated signaling; and sending, by the terminal in a connected mode or an inactive mode, a random access request to the base station by using one of the at least one random access parameter set, where the random access parameter set includes monitoring start time and/or a time window size of a random access response time window:

Optionally, the random access parameter set further includes a random access preamble sequence. The random access request includes the random access preamble sequence. The sending, by the terminal in a connected mode or an inactive mode, a random access request to the base station by using one of the at least one random access parameter set includes: determining, by the terminal in a connected mode or an inactive mode, a corresponding random access parameter set based on a logical channel or a logical channel group used for to-be-sent uplink data and/or signaling; and sending, by the terminal in a connected mode or an inactive mode, the random access preamble sequence in the random access parameter set to the base station based on the determined random access parameter set.

Optionally, after the sending a random access request to the base station, the method further includes: receiving, by the terminal, a random access response returned by the base station, where the random access response includes a plurality of random backoff indicators corresponding to a plurality of random access groups, logical channels, or logical channel groups; and determining, by the terminal, a corresponding random access group, logical channel, or logical channel group based on a random access event, and selecting a corresponding random backoff indicator from the plurality of random backoff indicators based on the determined random access group, logical channel, or logical channel group.

Optionally, the at least one random access parameter set is one random access parameter set. Alternatively, the at least one random access parameter set is a plurality of random access parameter sets corresponding to a plurality of random access groups. One or more random access groups correspond to one random access parameter set. The plurality of random access groups correspond to a public land mobile network PLMN accessed by the terminal in a connected mode or an inactive mode. Alternatively, the at least one random access parameter set is a random access parameter set corresponding to a plurality of logical channels or logical channel groups. One or more logical channels or logical channel groups correspond to one random access parameter set.

Optionally, the random access parameter set further includes one or any combination of the following parameters:

indication information of a random access preamble sequence:

indication information of a time-frequency resource occupied by the random access preamble sequence:

a timing time length of a contention resolution timer:

a maximum quantity of random access times; and a scheduling message size threshold.

According to a fifth aspect, a base station is provided, including:

a sending module, configured to send a plurality of random access parameter sets to a terminal by using a broadcast message; and a receiving module, configured to receive a random access request of the terminal, where one of the plurality of random access parameter sets is used in the random access request.

Optionally, the plurality of random access parameter sets are a plurality of random access parameter sets corresponding to a plurality of random access groups, and one or more random access groups correspond to one random access parameter set.

Optionally, the plurality of random access parameter sets include a random access parameter set corresponding to a default random access group.

Optionally, the random access parameter set further includes a random access preamble sequence. The random access request includes the random access preamble sequence. The sending module is further configured to: after the receiving module receives the random access request sent by the terminal, return a random access response message to the terminal. The random access response message includes indication information of an uplink resource allocated to the terminal. The uplink resource is allocated by the base station based on a scheduling message size threshold value corresponding to a random access group. The random access group is a random access group corresponding to the random access preamble sequence sent by the terminal.

Optionally, the sending module is further configured to: after the receiving module receives the random access request sent by the terminal, return a random access response to the terminal. The random access response includes a plurality of random backoff indicators corresponding to the plurality of random access groups.

According to a sixth aspect, a base station is provided, including:

a sending module, configured to send, by using dedicated signaling, at least one random access parameter set to a terminal in a connected mode or an inactive mode; and a receiving module, configured to receive a random access request of the terminal in a connected mode or an inactive mode, where one of the at least one random access parameter set is used in the random access request, and the random access parameter set includes monitoring start time and/or a time window size of a random access response time window:

Optionally, the random access parameter set further includes a random access preamble sequence. The random access request includes the random access preamble sequence. The sending module is further configured to: after the receiving module receives the random access request of the terminal in a connected mode or an inactive mode, return a random access response to the terminal. The random access response includes indication information of an uplink resource allocated to the terminal. The uplink resource is allocated by the base station based on a scheduling message size threshold value corresponding to a random access group. The random access group is a random access group corresponding to the random access preamble sequence sent by the terminal.

Optionally, the sending module is further configured to: after the receiving module receives the random access request of the terminal in a connected mode or an inactive mode, return the random access response to the terminal, where the random access response includes a plurality of random backoff indicators corresponding to a plurality of random access groups, logical channels, or logical channel groups.

Optionally, the at least one random access parameter set is one random access parameter set. Alternatively, the at least one random access parameter set is a plurality of random access parameter sets corresponding to a plurality of random access groups. One or more random access groups correspond to one random access parameter set. Alternatively, the at least one random access parameter set is a random access parameter set corresponding to a plurality of logical channels or logical channel groups. One or more logical channels or logical channel groups correspond to one random access parameter set.

Optionally, the random access parameter set further includes one or any combination of the following parameters:

indication information of a random access preamble sequence:

indication information of a time-frequency resource occupied by the random access preamble sequence;

a timing time length of a contention resolution timer;

a maximum quantity of random access times; and a scheduling message size threshold.

According to a seventh aspect, a terminal is provided, including:

a receiving module, configured to receive a plurality of random access parameter sets sent by a base station by using a broadcast message; and a sending module, configured to send a random access request to the base station by using one of the plurality of random access parameter sets.

Optionally, the plurality of random access parameter sets are a plurality of random access parameter sets corresponding to a plurality of random access groups, and one or more random access groups correspond to one random access parameter set.

Optionally, the plurality of random access parameter sets include a random access parameter set corresponding to a default random access group.

Optionally, the terminal further includes a determining module. The receiving module is further configured to: after the sending module sends the random access request to the base station, receive a random access response returned by the base station. The random access response includes a plurality of random backoff indicators corresponding to the plurality of random access groups. The determining module is configured to: determine a corresponding random access group based on a random access event, and select, based on the determined random access group, a corresponding random backoff indicator from the plurality of random backoff indicators corresponding to the plurality of random access groups.

According to an eighth aspect, a terminal is provided, including:

a sending module, configured to: when the terminal is in a connected mode or an inactive mode, receive at least one random access parameter set sent by a base station by using dedicated signaling; and a sending module, configured to: when the terminal is in a connected mode or an inactive mode, send a random access request to the base station by using one of the at least one random access parameter set, where the random access parameter set includes monitoring start time and/or a time window size of a random access response time window.

Optionally, the terminal further includes a determining module. The random access parameter set further includes a random access preamble sequence. The random access request includes the random access preamble sequence. The determining module is configured to determine a corresponding random access parameter set based on a logical channel or a logical channel group used for to-be-sent uplink data and/or signaling. The sending module is specifically configured to send the random access preamble sequence in the random access parameter set to the base station based on the determined random access parameter set.

Optionally, the terminal further includes a determining module. The receiving module is further configured to: after the sending module sends the random access request to the base station, receive a random access response returned by the base station. The random access response includes a plurality of random backoff indicators corresponding to a plurality of random access groups, logical channels, or logical channel groups. The determining module is configured to: determine a corresponding random access group, logical channel, or logical channel group based on a random access event, and select a corresponding random backoff indicator from the plurality of random backoff indicators based on the determined random access group, logical channel, or logical channel group.

Optionally, the at least one random access parameter set is one random access parameter set. Alternatively, the at least one random access parameter set is a plurality of random access parameter sets corresponding to a plurality of random access groups. One or more random access groups correspond to one random access parameter set. The plurality of random access groups correspond to a public land mobile network PLMN accessed by the terminal in a connected mode or an inactive mode. Alternatively, the at least one random access parameter set is a random access parameter set corresponding to a plurality of logical channels or logical channel groups. One or more logical channels or logical channel groups correspond to one random access parameter set.

Optionally, the random access parameter set further includes one or any combination of the following parameters:

indication information of a random access preamble sequence;

indication information of a time-frequency resource occupied by the random access preamble sequence;

a timing time length of a contention resolution timer; and a maximum quantity of random access times.

According to a tenth aspect, a communication method is provided, including: sending, by a base station by using dedicated signaling, a plurality of random access parameter sets to a terminal in a connected mode or an inactive mode; and receiving, by the base station, a random access request of the terminal in a connected mode or an inactive mode, where one of the plurality of random access parameter sets is used in the random access request.

According to an eleventh aspect, a communication method is provided, including: receiving, by a terminal in a connected mode or an inactive mode, a plurality of random access parameter sets sent by a base station by using dedicated signaling; and sending, by the terminal in a connected mode or an inactive mode, a random access request to the base station by using one of the plurality of random access parameter sets.

Optionally, in any one of the method and the optional implementation of the method provided in the first aspect to the eleventh aspect, the method further includes: sending, by the base station, configuration information of a random access group to the terminal, where the random access group is configured by a core network device. Further, one random access group corresponds to at least one of a public land mobile network PLMN, a service type, a network slice, an application type, and an access type. Optionally, the configuration information of the random access group includes at least one of a PLMN indication, a service type indication, a network slice indication, an application type indication, and an access type indication.

Optionally, in any one of the method and the optional implementation of the method provided in the first aspect to the eleventh aspect, the random access parameter set includes one or any combination of the following parameters:

indication information of a random access preamble sequence;

indication information of a time-frequency resource occupied by the random access preamble sequence;

monitoring start time and/or a time window size of a random access response time window;

a timing time length of a contention resolution timer;

a maximum quantity of random access times; and a scheduling message size threshold.

Optionally, the random access parameter set further includes a random backoff indicator.

According to a twelfth aspect, a base station is provided. The base station includes a memory and a processor. The memory is configured to store program code that needs to be executed by the processor. A communications interface is configured to communicate with a terminal. The processor is configured to execute the program code stored in the memory, and is specifically configured to perform the method in any one of the first aspect, the second aspect, and the tenth aspect.

According to a thirteenth aspect, a terminal is provided. The base station includes a memory and a processor. The memory is configured to store program code that needs to be executed by the processor. A communications interface is configured to communicate with a base station. The processor is configured to execute the program code stored in the memory, and is specifically configured to perform the method in any one of the third aspect, the fourth aspect, and the twelfth aspect.

According to a fourteenth aspect, a computer readable storage medium is provided, and is configured to store a computer software instruction used to perform a function of any one of the designs of the first aspect or the second aspect. The computer software instruction includes a program designed for performing the method in any one of the designs of the first aspect, the second aspect, or the tenth aspect.

According to a fifteenth aspect, a computer readable storage medium is provided, and is configured to store a computer software instruction used to perform a function of any one of the designs of the third aspect, the fourth aspect, or the eleventh aspect. The computer software instruction includes a program designed for performing the method in any one of the designs of the third aspect or the fourth aspect.

In the embodiments of this application, the base station may send a plurality of random access parameter sets to the terminal. When performing random access, the terminal may perform random access based on one of the plurality of random access parameter sets, and may perform differentiated random access processes in different scenarios.

DESCRIPTION OF EMBODIMENTS

Figures 1, 2:
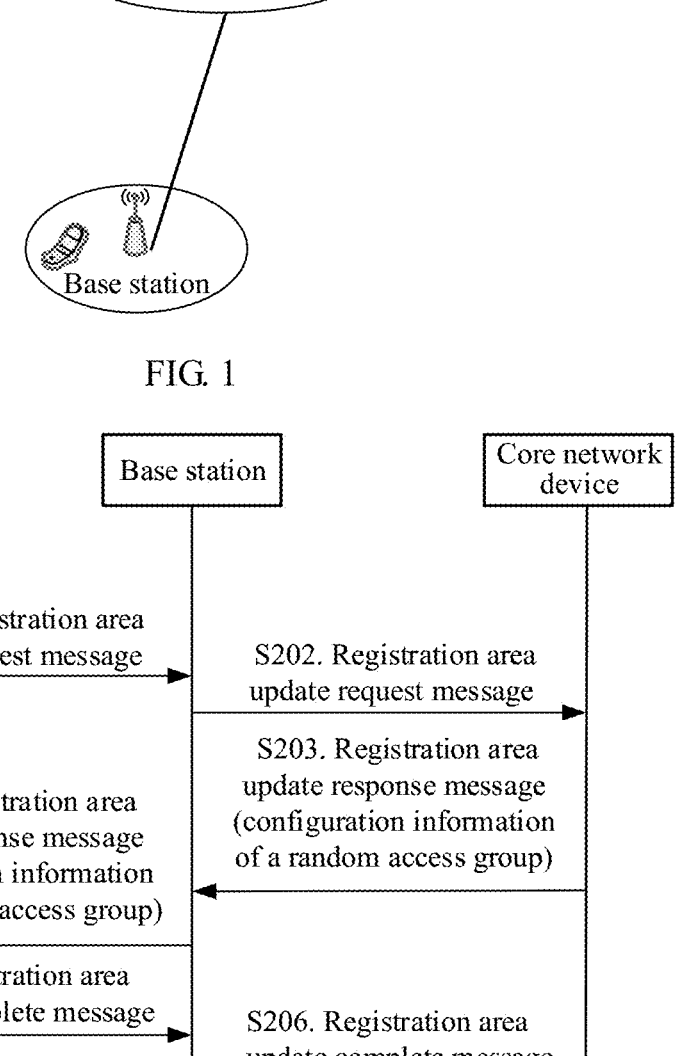
FIG. 1 shows an example of a schematic diagram of a 5G network architecture.
FIG. 2 shows an example of a schematic diagram of a registration area update procedure according to an embodiment of this application.

FIG. 1 shows an example of a schematic diagram of a 5G network architecture. As shown in the figure, the network architecture may include a base station, a core network device, and a terminal. The core network device is a 5G core network device, and the base station is a new radio base station or an evolved long term evolution (eLTE) base station. The terminal may communicate with the core network device by using the base station. For example, the terminal may be a mobile phone (or referred to as a "cellular" phone) or a computer that has a mobile terminal. For example, the terminal may alternatively be a portable, pocket-size, handheld, computer built-in or in-vehicle mobile apparatus, which exchanges voices and/or data with a radio access network. The terminal in embodiments of this application may alternatively be a D2D (device to device) terminal or an M2M (machine to machine) terminal.

Network slicing is a key technology of a 5G system. One network slice includes all resources that can meet a service requirement. For example, the network slice includes network functions of a control plane and a user plane of a core network, a resource of the core network (for example, a computing resource, a storage resource, and a network resource), and an air interface access network.

One terminal can simultaneously support and access a plurality of network slices. When the terminal initially accesses a network or performs tracking area update (, TAU), the terminal provides slice selection assistance information (NSSAI), so that the network selects a slice instance of a radio access network (RAN) part and a slice instance of a core network part. The NSSAI includes one piece of or a group of S-NSSAI (single management-network slice selection assistance information, session management-slice selection assistance information), and one piece of S-NSSAI may be used to select a specific network slice.

Each piece of S-NSSAI may include the following content: a slice/service type (SST), pointing to a specific feature and service type of a slice. Optionally, each piece of S-NSSAI may further include a slice differentiator (SD). As a supplement of the SST, the SD may be further used to distinguish between a plurality of network slice instances that meet a same SST.

In the 5G communications system, the terminal has three modes: an idle mode, a connected mode, and an inactive mode. There is no radio access control (RRC) connection between a terminal in an idle mode and the base station, there is an RRC connection between the base station and a terminal in a connected mode and an active mode, and the RRC connection between the terminal in an active mode and the base station is suspended.

All random access time in an existing LTE system is based on a set of random access parameters. This cannot meet different requirements of a plurality of service types, a plurality of network slices, and a plurality of access types in the 5G system. To meet different requirements of the plurality of service types, the plurality of network slices, and the plurality of access types in the 5G system, a random access solution of a random access group based on a service type, a network slice, an access requirement, a signaling level, and the like for a new radio random access process is proposed in the embodiments of this application, so that a network side can flexibly allocate an air interface resource in the random access process of the terminal based on different random access groups, thereby improving user experience, meeting a new transmission characteristic in new radio, and ensuring system flexibility, differentiation, and reliability in the random access solution.

In the embodiments of this application, a plurality of random access groups are defined. The random access group may be classified based on a service type, a slice type, a connection type, and the like. To differentiate different service types, slice types, and connection types in the random access process, a random access parameter set for each random access group is defined in the embodiments of this application.

A communication method provided in the embodiments of this application may relate to a random access parameter configuration step and a random access request initiation step, and may be implemented based on the network architecture shown in FIG. 1. Certainly, the communication method may also be implemented based on an evolved network architecture. The following describes in detail the embodiments of this application with reference to accompanying drawings.

Generally, the embodiments of this application provide the following solutions.

Solution 1: The base station sends a plurality of random access parameter sets to the terminal by using a broadcast message. "A plurality of" means two or more. The terminal may send a random access request to the base station by using one of the plurality of random access parameter sets, to perform a random access process with the base station. One or more random access groups correspond to one random access parameter set. Optionally, the plurality of random access parameter sets include a random access parameter set corresponding to a default random access group.

The solution may be applicable to the terminal in an idle mode, the terminal in a connected mode, or the terminal in an inactive mode. For example, the terminal in any one of an idle mode, a connected mode, and an inactive mode may receive the plurality of random access parameter sets sent by the base station by using the broadcast message. When needing to perform random access, the terminal in any one of an idle mode, a connected mode, and an inactive mode may initiate a random access process by using one of the plurality of random access parameter sets.

Solution 2: The base station sends, by using dedicated signaling, at least one random access parameter set to the terminal in a connected mode or an inactive mode. When the "at least one random access parameter set" refers to a plurality of random access parameter sets, the plurality of random access parameter sets may correspond to a plurality of random access groups. One or more random access groups correspond to one random access parameter set. The plurality of random access parameter sets may alternatively correspond to a plurality of logical channels or logical channel groups. One logical channel or logical channel group corresponds to one random access parameter set, or a plurality of logical channels or logical channel groups correspond to one random access parameter set.

The solution may be applicable to both the terminal in a connected mode and the terminal an inactive mode. When the "at least one random access parameter set" refers to one random access parameter set, the terminal in a connected mode or an inactive mode may initiate a random access process by using the random access parameter set. When the "at least one random access parameter set" refers to a plurality of random access parameter sets, the terminal in a connected mode or an inactive mode may initiate a random access process based on one of the plurality of random access parameter sets.

Solution 3: The solution 1 and the solution 2 are combined. For example, the base station may send a plurality of random access parameter sets to the terminal by using a broadcast message, or may send, by using dedicated signaling, at least one random access parameter set to the terminal in a connected mode or an inactive mode. The random access parameter set sent by the base station by using the broadcast message is used by the terminal in an idle mode to initiate random access, and the random access parameter set sent by the base station by using the dedicated signaling is used by the terminal in a connected mode or an inactive mode to initiate random access.

In the embodiments of this application, a random access group may be classified based on a factor such as a public land mobile network (PLMN) to which the terminal requests to access, a requested service type, a used network slice, and a used access type. Optionally, the service type may include a short message service (SMS), an IP multimedia subsystem (IMS) voice service, an IMS video service, and the like.

Optionally, the access type may include emergency service access, high-priority access, mobile terminated access, non-access stratum signaling, access stratum signaling, and the like.

Optionally, one random access group may correspond to at least one of the PLMN, the service type, the network slice, an application type, and the access type. Correspondingly, configuration information of one random access group includes at least one of a PLMN identifier, a service type identifier, a network slice identifier, an application type identifier, and an access type identifier. The network slice identifier may be the S-NSSAI (including the SST and the SD). Table 1 shows an example of configuration information of a random access group.

TABLE 1

| Configuration information of a random access group | | | | | |
|---|---|---|---|---|---|
| Grouping index | PLMN identifier | Network slice identifier | Application type identifier | Service type | . . . |
| 0 | 1 | * | 5 | Mobile Terminated (MT) (downlink . . . service trigger) | |
| 1 | 2 | * | * | Emergency call | . . . |
| 2 | * | * | * | Mobile Originated (MO) (uplink . . . service trigger) | |
| 3 | * | 3 | * | * | . . . |

Table 1 shows configuration information of a random access group 0, a random access group 1, a random access group 2, and a random access group 3. Configuration information of each random access group may include a PLMN identifier, a network slice identifier, an application type identifier, a service type identifier, and the like. A symbol "*" is a wildcard character, representing any matching. For example, in the configuration information of the random access group 2, the PLMN identifier is represented as *, indicating that any PLMN network may be used. Optionally, in configuration information of a default random access group, entries such as the PLMN identifier, the network slice identifier, and the service type identifier may be represented by using a wildcard character. A priority of the default random access group is the lowest. Only when the terminal cannot match another random access group other than the default random access group based on a random access event, the terminal selects the default random access group.

It can be learned from Table 1 that a unified random access group format is defined. The format may be used to define various possible application scenarios. At least one or more combinations of the PLMN identifier, the service type identifier, the network slice identifier, the application type identifier, and the access type identifier may be used to distinguish between different random access groups.

A random access group may be configured by the core network device and sent to the base station. The base station may send configuration information of the random access group to the terminal. In a process of accessing a network (that is, a network registration process), a service request (service request) process, a protocol data unit (PDU) session establishment process, or a registration update process, the configuration information of the random access group may be sent by the core network device to the terminal by using the base station.

FIG. 2 shows an example of a registration area update procedure of a terminal. In the procedure, a base station sends configuration information of a random access group to the terminal. As shown in the figure, the procedure may include the following steps:

S201 and S202. The terminal sends a registration area update request message to the base station, and the base station sends a registration area update request to a core network device.

S203. The core network device sends a registration area update response message to the base station, where the response message includes the configuration information of the random access group.

S204. The base station sends the registration area update response message to the terminal, where the response message includes the configuration information of the random access group.

S205 and S206. The terminal sends a registration area update complete message to the base station, and the base station sends the registration area update complete message to the core network device.

In this embodiment of this application, a random access parameter set may include one or any combination of the following parameters.

Indication information of a random access preamble sequence: The random access preamble sequence is also referred to as a physical random access channel (, PRACH) sequence. Indication information of a random access preamble sequence may be an index of a random access preamble sequence, or may be displacement of a random access preamble root sequence with respect to a random access preamble sequence. Optionally, indication information of a random access preamble sequence in different random access parameter sets is different. In this case, different random access groups correspond to different random access preamble sequences. When a plurality of terminals initiate random access, because the plurality of terminals may correspond to different random access groups, different random access preamble sequences may be used to send an Msg1 (namely, a first message in a random access process), so that impact of an Msg1 storm caused by a random access event on another random access event can be alleviated or even eliminated. In addition, service types, network handovers, application types, and the like can be distinguished on a network side in a random access phase (especially an initial random access phase), for example, whether a service initiated by the terminal is a URLLC service or an eMBB service, thereby providing a basis for processing and operation on the network side.

Optionally, 64 random access preamble sequences may be available in each cell. The preamble sequences are classified into two parts. One part is used for contention-based random access, and the other part is used for the non-contention based random access. The contention-based random access preamble sequence may be further classified into group A and group B.

Indication information of a time-frequency resource occupied by a random access preamble sequence: used to indicate the time-frequency resource occupied by the random access preamble sequence. Optionally, indication information of a time-frequency resource of a random access preamble sequence in different random access parameter sets is different. In this way, different random access groups correspond to different random access preamble time-frequency resources. When a plurality of terminals initiate random access, because the plurality of terminals may correspond to different random access groups, different random access preamble sequence time-frequency resources may be used to send an Msg1 message, so that impact of an Msg1 storm caused by a random access event on another random access event can be alleviated or even eliminated.

Monitoring start time and/or a time window size of a random access response time window: The random access response time window is used by the terminal to listen to a random access response message (namely, an Msg2 in a random access process) sent by the base station. After sending a random access preamble sequence (by using the Msg1) to the base station, the terminal may start the random access response time window; and listen to, in the time window; a random access response message returned by the base station. Optionally, the random access response time window may start from several subframes after a subframe in which the terminal sends the random access preamble sequence (denoted as the subframe for sending the random access preamble sequence+the monitoring start time of the time window), and the time window size of the time window is continued. The time window size may be several subframes, and is represented by using a random access response window size (ra-ResponseWindow Size) parameter of the time window:

One or more random access groups may correspond to one random access parameter set, and the random access group may be classified from the perspective of a service type, a network slice, and the like. In view of this, different random access response time window parameters may be set based on characteristics and requirements of different service types and/or different network slices. For example, short monitoring start time or a short time window size is set for a service of a URLLC type, so that a terminal that performs the service of this type can access a network quickly. Table 2 shows an example of monitoring start time and/or a time window size of a random access response time window in a random access parameter set corresponding to different random access groups.

TABLE 2

| Random access response time window parameters in a random access parameter set corresponding to different random access groups | | |
| --- | --- | --- |
| Random access group | Monitoring start time (transmission time interval (TTI) or ms) | Ra-Rsponse WindowSize (TTI or ms) |
| 0 | 2 | 4 |
| 1 | 3 | 6 |

In Table 2, a service type corresponding to a random access group 0 is URLLC, and a service type corresponding to a random access group 1 is eMBB. Because a latency requirement of a URLLC service is higher than that of an eMBB service, monitoring start time of a random access response time window in a random access parameter set corresponding to the random access group 0 is relatively short.

A timing time length of a contention resolution timer: The time length may be in a unit of ms, or may be in a unit of transmission time interval (TTI). The contention resolution timer is used by the terminal to listen to, within timing time of the timer, a contention resolution message returned by the base station (namely, an Msg4 in a random access process). After sending the Msg3 to the base station, the terminal may start the timer, and listen to, within the timing time of the timer, the contention resolution message returned by the base station. Optionally, different timing time lengths of the contention resolution timer may be set for different random access groups. For example, for a random access group corresponding to a URLLC type service, a relatively short time length may be set, to meet a latency requirement of the service of this type.

A maximum quantity of random access times: If a random access process of the terminal fails, the random access process may be re-initiated when the maximum quantity of random access times is not reached. Optionally, different maximum quantities of random access times may be set for different random access groups. For example, for the random access group corresponding to the URLLC type service, a relatively large maximum quantity of random access times may be set, to meet a reliability requirement of the service of this type.

A scheduling message (Msg3) size threshold: Different random access groups may correspond to different scheduling message (Msg3) size thresholds.

Further, a random access parameter set may further include a random backoff indicator, used to indicate a random backoff time length. When the terminal needs to re-initiate random access due to a random access failure, the terminal may randomly select a moment from a corresponding time interval based on the random backoff time length indicated by the random backoff indicator, to send the random access preamble sequence. Optionally, values of random backoff indicators corresponding to different random access groups may be different. For example, for a random access group corresponding to a service type with a high latency requirement, a relatively short random backoff time length is set for the random access group, so that a random access process is re-initiated as soon as possible when random access fails.

Further, a random access parameter set may further include an Msg3 threshold, where the Msg3 threshold is used to indicate random access preamble sequence groups (group A and group B) used when the terminal selects the Msg1. Optionally, values of Msg3 thresholds corresponding to different random access groups may be different. For example, for a random access group corresponding to an eMBB service type with a high throughput requirement, a relatively large Msg3 threshold is set for the random access group, so that the base station allocates a relatively large uplink resource when allocating an uplink resource corresponding to the Msg3.

The foregoing is only an example of a random access parameter included in a random access parameter set. The foregoing listed random parameters may alternatively be replaced with other random parameters, or another random access parameter may be included in addition to the foregoing listed random access parameters. For example, the random access parameter set may further include a quantity of random access preamble sequences, grouping information of a random access preamble sequence (the contention-based random access preamble sequence may be classified into group A and group B), and the like. The grouping information of the random access preamble sequence may be indication information of the group A or indication information of the group B.

The random access parameter included in the random access parameter set may be organized by using a plurality of data structures. For example, a random access parameter included in a random access parameter set may be divided into three parameter subsets.

Parameter subset 1: also referred to as a random access channel common configuration (RACH-Config Common) subset. RACH-Config Common may include one or more of the following parameters: a quantity of random access preamble sequences, grouping information of a random access preamble sequence, and a scheduling message (Msg3) size threshold value. The foregoing is merely an example, and RACH-Config Common may further include another parameter.

Parameter subset 2: also referred to as a PRACH system configuration (PRACH-ConfigSIB) subset. PRACH-ConfigSIB may include one or more of the following parameters: a random access preamble root sequence, and PRACH time-frequency resource information. The PRACH time-frequency resource information is used to indicate a time-frequency resource occupied by a random access preamble sequence. The foregoing is merely an example, and PRACH-ConfigSIB may further include another parameter.

Parameter subset 3: also referred to as a timer and a time window subset. The subset may include one or more of the following parameters: a random access response window size (ra-RponseWindowSize), a random backoff indicator, and a contention resolution timer (mac-ContentionResolutionTimer) timing time length. The foregoing is merely an example, and the subset may further include another parameter.

Table 3 shows, in a list manner, an example of three random access parameter sets sent by the base station by using a broadcast message.

TABLE 3

| A plurality of random access parameter sets sent by a base station by using broadcast message | | | |
|---|---|---|---|
| Random access group | RACH-Config Common | PRACH-ConfigSIB | Timer and time window |
| 0 | Parameter subset | Parameter subset | Parameter subset |
| 1 | Parameter subset | Parameter subset | Parameter subset |
| 2 | Parameter subset | Parameter subset | Parameter subset |

Table 3 shows three random access parameter sets corresponding to a random access group 0, a random access group 1, and a random access group 2. Each random access parameter set includes a RACH-Config Common parameter subset, a PRACH-ConfigSIB parameter subset, and a timer and time window parameter subset.

Parameters included in different random access parameter sets may have the following cases: Parameter values of some parameters are the same, or parameter values of all parameters are the same, or parameter values of all parameters are different. Therefore, different random access parameter sets have a plurality of representation manners. Several possible cases are listed below.

Case 1: For different random access parameter sets, random access preamble sequences included in the random access parameter sets are different and belong to different random access preamble sequence groups. However, time-frequency resources occupied by the random access preamble sequences are the same, and Msg3 size threshold values in different random access parameter sets are also different.

Case 2: For different random access parameter sets, random access preamble sequences included in the random access parameter sets are the same and belong to a same random access preamble sequence group. However, time-frequency resources occupied by the random access preamble sequences are different, and Msg3 size threshold values in different random access parameter sets are the same.

Case 3: For different random access parameter sets, random access preamble sequences included in the random access parameter sets are different and belong to different random access preamble sequence groups. Time-frequency resources occupied by the random access preamble sequences are also different, and Msg3 size threshold values in different random access parameter sets are also different.

A parameter type included in a random access parameter set corresponding to a logical channel or logical channel group is similar to that in the foregoing embodiment. Parameter values in random access parameter sets corresponding to different logical channels or logical channel groups may be the same or may be different. Based on different priorities of the logical channels or the logical channel groups, different values may be set for parameters in random access parameter sets corresponding to logical channels or logical channel groups with different priorities. A logical channel 1 and a logical channel 2 are used as an example. A random parameter set corresponding to the logical channel 1 is a set A. A random access parameter set corresponding to the logical channel 2 is a set B. A priority of the logical channel 1 is higher than a priority of the logical channel 2. In this case, random access parameters in the set A and the set B may include one or a combination of the following features.

In the set A and the set B, random access preamble sequences are different and/or time-frequency resources occupied by the random access preamble sequences are different. In this case, the base station may determine a corresponding logical channel or logical channel group based on a received random access preamble sequence and/or a time-frequency resource occupied by the sequence, so as to provide a basis for a subsequent operation.

In the set A and the set B, monitoring start time and/or time window sizes of random access response time windows are different, and monitoring start time and duration of a random access response time window in the set A are relatively short. This can ensure that data that uses a logical channel or a logical channel group with a high priority can be transmitted as soon as possible.

In the set A and the set B, maximum quantities of random access times are different, and a maximum quantity of random access times in the set A is relatively large. In this case, an access success rate of a high-priority logical channel or logical channel group can be ensured.

In the set A and the set B, timing time lengths of contention resolution timers are different, and a timing time length of a contention resolution timer in the set A is relatively long. In this case, for a high-priority logical channel or logical channel group, it is ensured that a contention resolution message can be received as much as possible.

Optionally, values of random backoff indicators corresponding to different logical channels or logical channel groups are different. For example, random backoff time corresponding to a high-priority logical channel or logical channel group is relatively short (a smaller value may indicate earlier performing of random backoff). In this case, random access may be performed as soon as possible for the high-priority logical channel or logical channel group.

In this embodiment of this application, the foregoing random access parameter set may be sent by the base station to the terminal, so that the random access parameter set is used by the terminal during random access. A random access parameter configuration process and a random access process provided in the embodiments of this application are described in detail below with reference to the accompanying drawings.

Figures 3, 4:
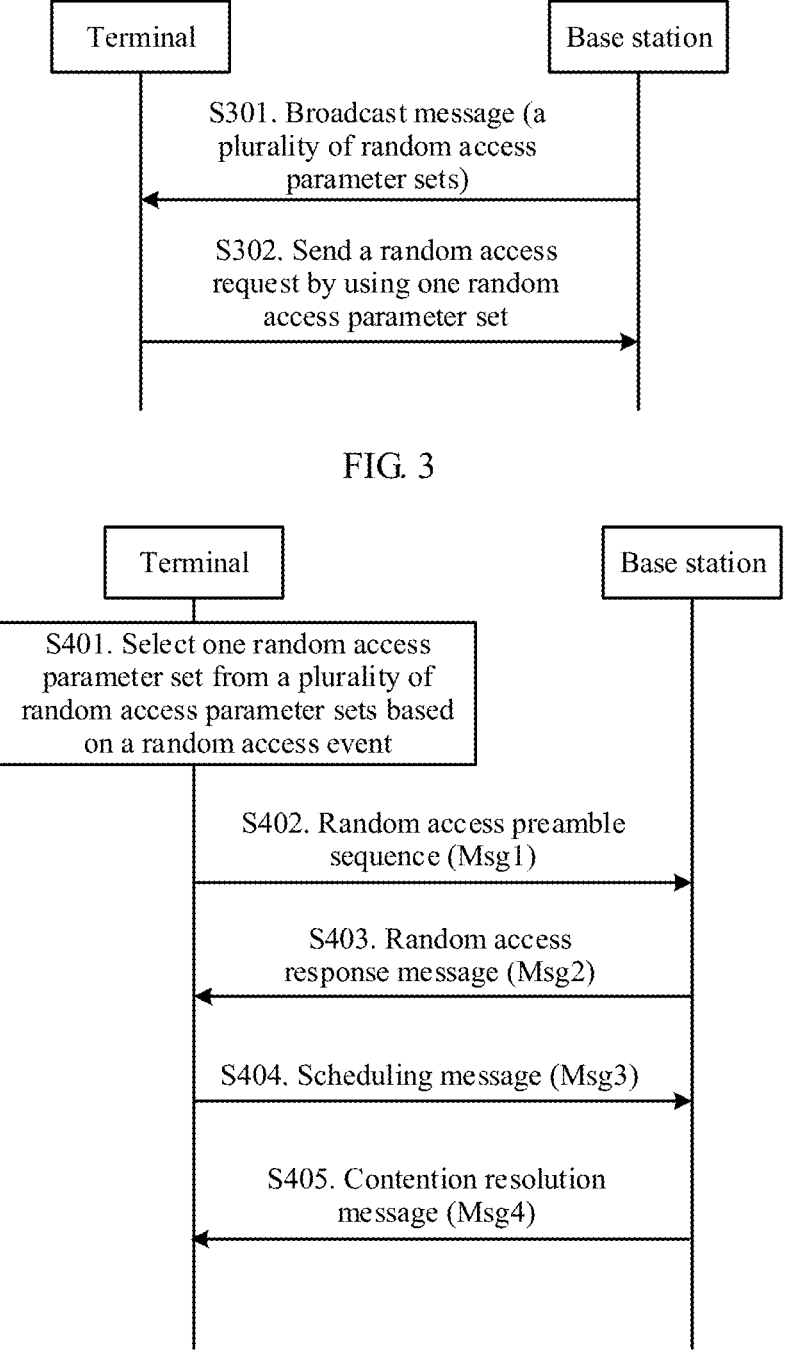
FIG. 3 shows an example of a schematic diagram of a random access procedure according to an embodiment of this application.
FIG. 4 shows an example of an implementation process of S302 in FIG. 3.

FIG. 3 shows an example of a communication procedure according to an embodiment of this application. The procedure shown in FIG. 3 may be applicable to the scenario described in the solution 1. This procedure is also applicable to the scenario described in the solution 3. In the scenario, a terminal in an idle mode initiates a random access process by using one of a plurality random access parameter sets sent by a base station by using a broadcast message.

As shown in the figure, the procedure may include the following steps.

S301. A base station sends a plurality of random access parameter sets to a terminal by using a broadcast message.

In this step, the base station sends the plurality of random access parameter sets by using the broadcast message. Therefore, the terminal may receive the plurality of random access parameter sets regardless of whether the terminal is in an idle mode, a connected mode, or an inactive mode. After receiving the plurality of random access parameter sets sent by the base station, the terminal may store the plurality of random access parameter sets in the terminal.

The plurality of random access parameter sets sent by the base station may be random access parameter sets corresponding to a plurality of random access groups, and one or more random access groups may correspond to one random access parameter set. Optionally, the plurality of random access parameter sets include a random access parameter set corresponding to a default random access group.

S302. The terminal sends a random access request to the base station by using one group of the plurality of random access parameter sets, to trigger a random access process.

In this step, the terminal may initiate the random access process based on one of the plurality of random access parameter sets regardless of whether the terminal is in an idle mode, a connected mode, or an inactive mode. For example, when the terminal is in an idle mode, if there is uplink data and/or signaling to be sent, the random access process may be initiated by using one of the plurality of random access parameter sets. For another example, when the terminal is in a connected mode, if there is uplink data and/or signaling to be sent, but uplink is out of synchronization, the random access process may be initiated by using one of the plurality of random access parameter sets. The foregoing merely gives an example of some reasons for triggering random access. Certainly, the random access process may be triggered for another reason, for example, when the terminal in a connected mode performs handover or terminal positioning. Examples are not given one by one herein.

That the terminal sends the random access request and triggers the random access process based on the random access request in S302 in FIG. 3 includes a signaling interaction process between the terminal and the base station. FIG. 4 shows an example of an implementation process of S302 in FIG. 3. As shown in FIG. 4, the process may include the following steps.

S401. A terminal selects, based on a random access event that triggers a random access process, one random access parameter set from a plurality of random access parameter sets sent by a base station.

The random access event may trigger the random access process. There may be various random access events to describe different random access triggering reasons, scenarios, and the like. For example, the random access event may include:

(1) initial access;

(2) RRC connection re-establishment;

(3) cell handover;

(4) downlink data of a terminal in a connected mode arrives but uplink is out of synchronization;

(5) uplink data of the terminal in a connected mode arrives but uplink is out of synchronization; and (6) the terminal in a connected mode performs positioning.

In this embodiment of this application, the random access event may be further refined, so that the terminal selects a corresponding random access parameter set based on a more refined scenario or reason. For example, the further refined random access event may be described as follows.

(1) Initial Access

The random access event may be further classified from the perspective of a service type, a network slice, a PLMN, an application type, and an access type. A classification perspective of the random access event is similar to a classification perspective of a random access group.

(2) the Uplink Data of the Terminal in a Connected Mode Arrives but Uplink is Out of Synchronization.

The random access event may be further classified from the perspective of a service type, a network slice, a PLMN, an application type, and an access type. A classification perspective of the random access event is similar to a classification perspective of a random access group.

S402. The terminal sends a random access preamble sequence (for example, an Msg1 shown in the figure) to the base station, this step corresponds to S302 in FIG. 3, and the random access preamble sequence sent in S402 may be understood as a special case or an example of the random access request sent in S302.

In this step, if the random access parameter set selected by the terminal includes indication information of the random access preamble sequence, the terminal may send a corresponding random access preamble sequence based on the indication information of the random access preamble sequence. If the random access parameter set selected by the terminal includes time-frequency resource indication information of the random access preamble sequence, the terminal may send the random access preamble sequence by using a corresponding time-frequency resource.

Further, if the random access parameter set selected by the terminal includes monitoring start time and/or a time window size of a random access response time window; the terminal may listen on a physical downlink control channel (PDCCH) in a corresponding time period (that is, the random access response time window) after sending the random access preamble sequence, to receive a random access response message sent by the base station.

S403. After receiving the random access preamble sequence (Msg1) sent by the terminal, the base station allocates an uplink resource to the terminal, and returns a random access response message (for example, an Msg2 in the figure) to the terminal, where the random access response message carries indication information of the uplink resource allocated to the terminal and the random access preamble sequence sent by the terminal in S402.

In this step, when the base station determines a corresponding random access group based on the received random access preamble sequence and/or a time-frequency resource occupied by the random access preamble sequence, the base station may allocate an uplink resource in a corresponding size to the terminal based on a scheduling message (Msg3) size threshold value corresponding to the determined random access group, so that the uplink resource allocated to the terminal can be used to transmit an Msg3 whose size does not exceed the size threshold value. One or more random access groups may correspond to a size threshold value of one Msg3. Optionally, size threshold values of an Msg3 corresponding to different random access groups may be different, so as to meet requirements of the Msg3 message in different cases. For example, a corresponding random access group set is set for different access types (access of a terminal in an inactive mode, initial access, and the like). For a random access group corresponding to the type of access of the terminal in an inactive mode, a size threshold value of an Msg3 corresponding to the random access group is relatively large, so as to meet a requirement that the terminal in an inactive mode needs to carry a Resume ID or even data in the Msg3. For a random access group corresponding to the initial access type, a size threshold value of an Msg3 corresponding to the random access group is relatively small, so as to meet a requirement that an initial random access terminal carries an S-TMSI or a random number in the Msg3 message. In this way, if the base station determines that the access type of the terminal is access of a terminal in an inactive mode, a relatively large uplink resource may be allocated to the terminal. If the base station determines that the access type of the terminal is initial access, a relatively small uplink transmission resource may be allocated to the terminal.

If random access preamble sequences corresponding to different random access groups are different, time-frequency resources occupied by the random access preamble sequences are different, or combinations of a random access preamble sequence and a time-frequency resource occupied by the random access preamble sequence are different, the base station may determine a corresponding random access group based on the received Msg1.

S404. After the terminal receives the random access response message (Msg2), if the message includes the random access preamble sequence sent by the terminal in S402, the terminal sends a scheduling message (an Msg3 in the figure) based on the uplink resource allocated by the base station.

In this step, after sending the Msg3, the terminal may start a contention resolution timer, and listen on the PDCCH within timing time of the contention resolution timer, to receive a contention resolution message (Msg4) returned by the base station. Further, if the terminal performs a hybrid automatic repeat request (HARQ) for the Msg3, the timer is reset.

S405. After receiving the scheduling message (Msg3) sent by the terminal, the base station returns a contention resolution message (an Msg4 in the figure) to the terminal, and if the Msg4 indicates that a conflict is resolved successfully, the terminal determines that the random access process is successful.

Optionally, if the base station cannot access the terminal after receiving the Msg1 sent by the terminal, a random backoff indicator may be included in the random access response message returned to the terminal. If the base station may determine a corresponding random access group based on a received random access preamble sequence and/or a time-frequency resource occupied by the random access preamble sequence, a random backoff indicator corresponding to the random access group may be carried in the random access response message. If the base station cannot determine a corresponding random access group based on a received random access preamble sequence and/or a time-frequency resource occupied by the random access preamble sequence, a random backoff indicator corresponding to each random access group may be carried in the random access response message. Optionally, one or more random access groups correspond to one random backoff indicator.

Figure 5:
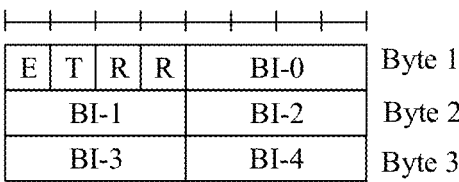
FIG. 5 shows an example of a schematic structural diagram of a media access control-control element (MAC CE) according to an embodiment of this application.

In an embodiment, a new MAC CE format in an Msg2 is defined to carry a plurality of random backoff indicators corresponding to a plurality of random access groups. FIG. 5 shows an example of a MAC CE that carries random backoff indicators corresponding to five random access groups. BI-0) to BI-4 in the MAC CE are random backoff indicators respectively corresponding to a random access group 0 to a random access group 4. Optionally, quantities of bits occupied by the random backoff indicators are the same. A correspondence between a random backoff indicator included in the MAC CE and a random access group may be stipulated, for example, five random access groups are used as an example. In this case, the random backoff indicators included in the MAC CE sequentially correspond to the five random access groups in a stipulated order. A correspondence is shown in FIG. 5.

In another embodiment, the MAC CE in the Msg2 carries one random backoff indicator. A random backoff indicator (random backoff time) corresponding to each random access group may be obtained through calculation in the following manner: using the random backoff indicator included in the MAC CE as a reference value, and multiplying a random access time coefficient corresponding to the random access group to obtain the random backoff time corresponding to the random access group. A value range of the random access time coefficient may be set to (0), 1), in other words, the random access time coefficient is greater than 0 and less than 1.

Optionally, when a random access parameter set sent by a base station to a terminal includes the random backoff indicator, a random access response message sent by the base station may not include the random backoff indicator.

Further, if the Msg2 received by the terminal includes a plurality of random backoff indicators or random backoff time coefficients corresponding to random access groups, the terminal may select, based on the random access group determined in S401, a corresponding random backoff indicator or random backoff time coefficient from the plurality of random backoff indicators corresponding to the random access groups, to perform a random backoff process.

In the foregoing procedure, in S405, if the Msg4 received by the terminal indicates that conflict resolution fails, the terminal may determine whether a maximum quantity of random access times is currently reached. If the maximum quantity of random access times is not reached currently, the terminal may start a random backoff timer based on a random backoff indicator, and perform random backoff, to be specific, a random access process is re-initiated when the random backoff timer expires. The initiated random access process may refer to S402 to S405 in the foregoing procedure. If the maximum quantity of random access times is currently reached, the terminal may further notify a high layer that a random access problem occurs. The high layer may be wireless (for example, an RRC layer).

If the random access parameter set selected by the terminal in S401 includes the maximum quantity of random access times, the terminal may determine, based on the maximum quantity of random access times, whether the maximum quantity of random access times is currently reached. If the random access parameter set does not include the maximum quantity of random access times, the terminal may determine, based on a default maximum quantity of random access times, whether the maximum quantity of random access times is currently reached. The default maximum quantity of random access times is applicable to all random access groups.

In the foregoing procedure, after the base station sends the Msg2, if the terminal does not receive, within a random access response time window; an Msg3 returned by the base station, or receives an Msg3 but the Msg3 does not include the random access preamble sequence sent by the terminal in S402, the terminal determines that the current random access process fails. In this case, in a solution, the terminal may re-initiate a random access process when the maximum quantity of random access times is not reached. In another solution, if the Msg2 includes a random backoff indicator or the terminal may determine a random backoff indicator based on the received Msg2, the terminal may start the random backoff timer based on the random backoff indicator when the maximum quantity of random backoff times is not reached. A timing length of the random backoff timer is a random time between 0) and a time length value indicated by the random backoff indicator. The terminal re-initiates the random access process when the random backoff timer expires. A re-initiated random access process may refer to S402 to S405 in the foregoing procedure.

It can be learned from the foregoing procedures shown in FIG. 3 and FIG. 4 that, based on the plurality of random access parameter sets corresponding to the random access groups, the terminal can select one corresponding random access parameter set to perform random access based on a random access group corresponding to the terminal. The random access group may be classified based on a service type, a network slice, and the like. Therefore, different random access parameter sets may be set for different service types and network slices, to meet features and requirements of corresponding service types and network slices, so that differentiation between different events that trigger random access is implemented in a random access process, and terminal experience is improved.

Figure 6:
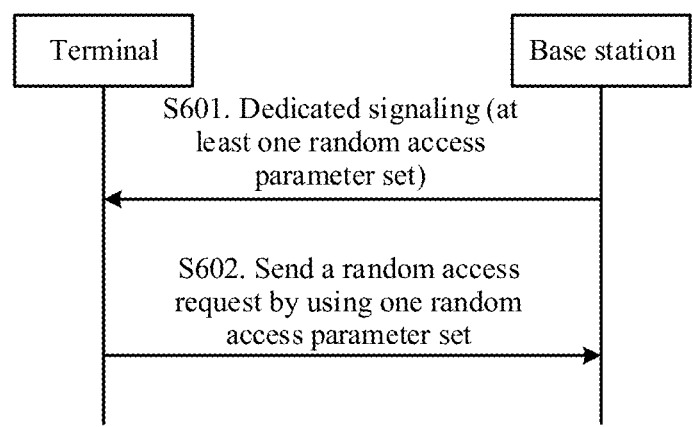
FIG. 6 shows an example of a schematic diagram of a random access procedure according to another embodiment of this application.

FIG. 6 shows an example of a random access procedure according to an embodiment of this application. The procedure shown in FIG. 6 may be applicable to the scenario described in the solution 2. This procedure is also applicable to the scenario described in the solution 3. In the scenario, a terminal in a connected mode or an inactive mode performs a random access process by using one of random access parameter sets sent by a base station by using dedicated signaling.

As shown in the figure, the procedure may include the following steps.

S601. A base station sends at least one random access parameter set to a terminal in a connected mode or an inactive mode by using the dedicated signaling.

In this step, after the terminal completes the random access procedure and establishes an RRC connection to the base station, the base station may send an RRC connection reconfiguration message, and the at least one random access parameter set is sent to the terminal by using the message. Optionally, the terminal returns an RRC connection reconfiguration complete message to the base station. Certainly, the base station may alternatively send the at least one random access parameter set to the terminal in a connected mode or an inactive mode by using other dedicated signaling.

The at least one random access parameter set may include the following cases:

Case 1: A plurality of random access parameter sets corresponding to random access groups. Optionally, the plurality of random access parameter sets include a random access parameter set corresponding to a default random access group. Random access groups may be classified in a same manner as that in the foregoing embodiment. Values of parameters in the plurality of random access parameter sets sent by using the dedicated signaling may be different from values of parameters in random access parameter sets that correspond to random access groups and that are sent by using a broadcast message.

Optionally, because the base station may obtain an identifier of a PLMN accessed by the terminal, the random access parameter set sent by the base station to the terminal by using the dedicated signaling may include only a random access parameter set corresponding to the PLMN (namely, a PLMN currently accessed by the terminal). For example, the identifier of the PLMN currently accessed by the terminal is a PLMN ID 1. Table 5 shows an example of a random access group 0 and a random access group 1 that are corresponding to the PLMN ID 1.

TABLE 4

| Configuration information of a random access group corresponding to a same PLMN | | | | | |
|---|---|---|---|---|---|
| Random access group | PLMN identifier | Network handover identifier | Application type identifier | Service type identifier | . . . |
| 0 | 1 | 3 | 5 | * | . . . |
| 1 | 1 | * | * | * | . . . |

"*" in Table 5 represents a wildcard character.

Case 2: A random access parameter set corresponding to a plurality of logical channels or logical channel groups. One logical channel or logical channel group may correspond to one random access parameter set, or a plurality of logical channels or logical channel groups may correspond to one random access parameter set. Parameter values in random access parameter sets corresponding to different logical channels or logical channel groups may be the same or may be different.

Case 3: One random access parameter set. The random access parameter set may be dedicated to the terminal in a connected mode or an inactive mode for random access. When the base station sends one random access parameter set by using the dedicated signaling, the random access parameter set includes a monitoring start time and/or a time window size of a random access response time window. Further, the random access parameter set may further include another parameter, for example, may include one or any combination of the following parameters: indication information of a random access preamble sequence, indication information of a time-frequency resource occupied by a random access preamble sequence, timing time length of a contention resolution timer, and a maximum quantity of random access times.

S602. The terminal in a connected mode or an inactive mode sends a random access request to the base station based on one of the at least one random access parameter set, to trigger a random access process.

In this step, there are a plurality of reasons for triggering the terminal in a connected mode or an inactive mode to initiate the random access process. For example, when the terminal is in a connected mode, if there is uplink data and/or signaling to be sent but uplink is out of synchronization, the terminal may perform the random access process.

The random access process triggered in S602 in FIG. 6 includes a signaling interaction process between the terminal and the base station. S602 and signaling interaction of the triggered random access process are similar to the signaling interaction process shown in FIG. 4.

Based on the foregoing several cases in which the base station sends the at least one random access parameter set by using the dedicated signaling in S601, the signaling interaction process of random access between the terminal and the base station may include the following several cases:

Case 1: The base station sends, by using the dedicated signaling, a plurality of random access parameter sets corresponding to random access groups. In this case, an implementation process of a random access process initiated by the terminal may be the same as the procedure shown in FIG. 4.

Case 2: The base station sends, by using the dedicated signaling, a random access parameter set corresponding to a plurality of logical channels or logical channel groups. In this case, the terminal may select one corresponding random access parameter set based on a logical channel or logical channel group used for to-be-sent uplink data and/or signaling. After the terminal selects a random access parameter set, a random access process performed based on the random access parameter set is similar to a corresponding part of the procedure shown in FIG. 4. The "random access group" described in S402 to S405 may be replaced with the "logical channel or logical channel group".

For example, before sending an Msg1 message, the terminal may determine a corresponding random access parameter set based on the logical channel or logical channel group used for the to-be-sent uplink data and/or signaling. The terminal sends the Msg1 based on a random access preamble sequence in the random access parameter set and a time-frequency resource of the preamble sequence. Further, the terminal may start a random access response time window based on monitoring start time and/or a time window size of the random access response time window in the random access parameter set, and listen to, within the time window; the Msg2 returned by the base station.

After receiving the Msg1, the base station may determine a corresponding logical channel or logical channel group based on a random access preamble sequence sent by the terminal and/or a time-frequency resource occupied by the sequence, allocate an uplink resource to the terminal based on an Msg3 size threshold value corresponding to the logical channel or logical channel group, add indication information of the uplink resource to the Msg2, and return the Msg2 to the terminal.

For another example, the base station may add a plurality of random backoff indicators corresponding to a plurality of logical channels or logical channel groups to the Msg2, and return the Msg2 to the terminal. One or more logical channels or logical channel groups correspond to one random backoff indicator. A MAC CE format in the Msg2 may be shown in FIG. 5. In another embodiment, the MAC CE in the Msg2 carries one random backoff indicator. A random backoff indicator (random backoff time) corresponding to each random access logical channel or logical channel group may be obtained through calculation in the following manner: using the random backoff indicator included in the MAC CE as a reference value, and multiplying a random access time coefficient corresponding to the random access logical channel or logical channel group, to obtain the random backoff time corresponding to the random access logical channel or logical channel group. A value range of the random access time coefficient may be set to (0), 1), in other words, the random access time coefficient is greater than 0 and less than 1.

Case 3: The base station sends a random access parameter set by using the dedicated signaling. In this case, the terminal initiates a random access process based on the random access parameter set. The random access process is similar to a corresponding part of the procedure shown in FIG. 4. A difference lies in that there is only one parameter set used by the terminal in a connected mode or an inactive mode to perform random access, so that neither the base station nor the terminal needs to perform a selection operation of the random access parameter set.

It may be learned from the foregoing descriptions that, in this embodiment of this application, the base station may send a plurality of random access parameter sets to the terminal. When performing random access, the terminal may perform random access based on one of the plurality of random access parameter sets, and may perform differentiated random access processes in different scenarios.

Figure 7:
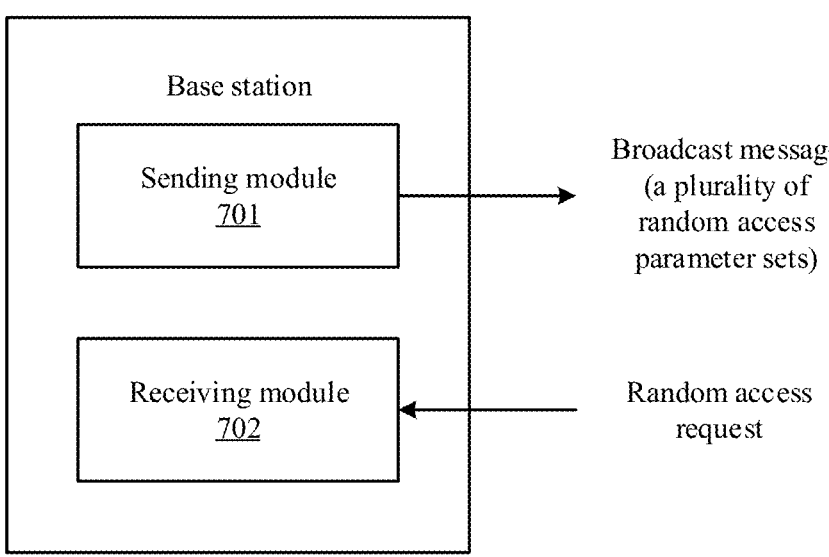
FIG. 7 and FIG. 8 separately show an example of a schematic structural diagram of a base station according to an embodiment of this application.

Based on a same technical conception, an embodiment of this application further provides a base station. FIG. 7 shows an example of a structure of the base station. The base station may perform the procedures implemented on a base station side in the procedures shown in FIG. 3 and FIG. 4. The base station may include a sending module 701 and a receiving module 702. The sending module 701 may be a transmitter, configured to send information. The receiving module 702 may be a receiver, configured to receive information. In an example, the sending module 701 may be a wireless signal transmitter, configured to send a wireless signal, and the receiving module 702 may be a wireless signal transmitter, configured to transmit a wireless signal. Further, the sending module 701 and the receiving module 702 may be connected to a processor (not shown in the figure). The receiving module may send received information to the processor for processing, and the sending module may send the information processed by the processor.

The sending module 701 is configured to send a plurality of random access parameter sets to a terminal by using a broadcast message. The receiving module 702 is configured to receive a random access request of the terminal. One of the plurality of random access parameter sets is used in the random access request.

Optionally, the plurality of random access parameter sets are a plurality of random access parameter sets corresponding to a plurality of random access groups, and one or more random access groups correspond to one random access parameter set.

Optionally, the plurality of random access parameter sets include a random access parameter set corresponding to a default random access group.

Optionally, the random access parameter set further includes a random access preamble sequence. The random access request includes the random access preamble sequence. The sending module 701 is further configured to: after the receiving module 702 receives the random access request sent by the terminal, return a random access response message to the terminal. The random access response message includes indication information of an uplink resource allocated to the terminal. The uplink resource is allocated by the base station based on a scheduling message size threshold value corresponding to a random access group. The random access group is a random access group corresponding to the random access preamble sequence sent by the terminal.

Optionally, the sending module 701 is further configured to: after the receiving module 702 receives the random access request sent by the terminal, return a random access response to the terminal. The random access response includes a plurality of random backoff indicators corresponding to the plurality of random access groups.

Figure 8:
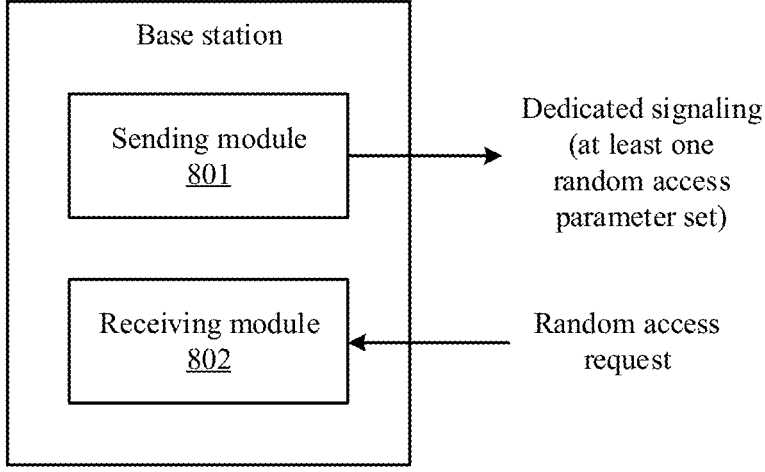

Based on a same technical conception, an embodiment of this application further provides a base station. FIG. 8 shows an example of a structure of the base station. The base station may perform the procedure implemented on a base station side in the procedure shown in FIG. 6. The base station may include a sending module 801 and a receiving module 802. The sending module 801 may be a transmitter, configured to send information. The receiving module 802 may be a receiver, configured to receive information. In an example, the sending module 801 may be a wireless signal transmitter, configured to send a wireless signal, and the receiving module 802 may be a wireless signal transmitter, configured to transmit a wireless signal. Further, the sending module 801 and the receiving module 802 may be connected to a processor (not shown in the figure). The receiving module may send received information to the processor for processing, and the sending module may send the information processed by the processor.

The sending module 801 is configured to send, by using dedicated signaling, at least one random access parameter set to a terminal in a connected mode or an inactive mode. The receiving module 802 is configured to receive a random access request of the terminal in a connected mode or an inactive mode. One of the at least one random access parameter set is used in the random access request. The random access parameter set includes monitoring start time and/or a time window size of a random access response time window:

Optionally, the random access parameter set further includes a random access preamble sequence. The random access request includes the random access preamble sequence. The sending module 801 is further configured to: after the receiving module 802 receives the random access request sent by the terminal in a connected mode or an inactive mode, return a random access response to the terminal. The random access response includes indication information of an uplink resource allocated to the terminal. The uplink resource is allocated by the base station based on a scheduling message size threshold value corresponding to a random access group. The random access group is a random access group corresponding to the random access preamble sequence sent by the terminal.

Optionally, the sending module 801 is further configured to: after the receiving module receives the random access request of the terminal in a connected mode or an inactive mode, return the random access response to the terminal, where the random access response includes a plurality of random backoff indicators corresponding to a plurality of random access groups, logical channels, or logical channel groups.

Optionally, the at least one random access parameter set is one random access parameter set. Alternatively, the at least one random access parameter set is a plurality of random access parameter sets corresponding to a plurality of random access groups. One or more random access groups correspond to one random access parameter set. Alternatively, the at least one random access parameter set is a random access parameter set corresponding to a plurality of logical channels or logical channel groups. One or more logical channels or logical channel groups correspond to one random access parameter set.

Optionally, the random access parameter set further includes one or any combination of the following parameters:

indication information of a random access preamble sequence;

indication information of a time-frequency resource occupied by the random access preamble sequence;

a timing time length of a contention resolution timer; and a maximum quantity of random access times.

Figure 9:
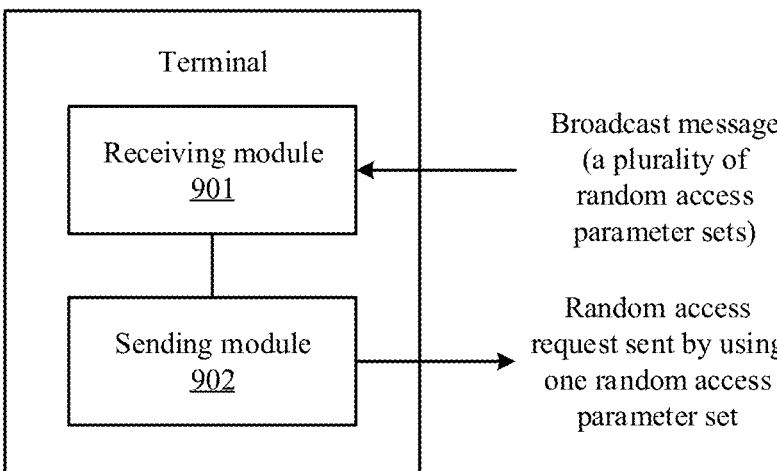
FIG. 9 and FIG. 10 separately show an example of a schematic structural diagram of a terminal according to an embodiment of this application.

Based on a same technical conception, an embodiment of this application further provides a terminal. FIG. 9 shows an example of a structure of the terminal. The terminal may perform the procedures implemented on a terminal side in the procedures shown in FIG. 3 and FIG. 4. The terminal may include a receiving module 901 and a sending module 902. The sending module 902 may be a transmitter, configured to send information. The receiving module 901 may be a receiver, configured to receive information. In an example, the sending module 902 may be a wireless signal transmitter, configured to send a wireless signal, and the receiving module 901 may be a wireless signal transmitter, configured to transmit a wireless signal. Further, the sending module 902 and the receiving module 901 may be connected to a processor (not shown in the figure). The receiving module may send received information to the processor for processing, and the sending module may send the information processed by the processor.

The receiving module 901 is configured to receive a plurality of random access parameter sets sent by a base station by using a broadcast message. The sending module 902 is configured to send a random access request to the base station by using one of the plurality of random access parameter sets.

Optionally, the plurality of random access parameter sets are a plurality of random access parameter sets corresponding to a plurality of random access groups, and one or more random access groups correspond to one random access parameter set.

Optionally, the plurality of random access parameter sets include a random access parameter set corresponding to a default random access group.

Optionally, the terminal further includes a determining module (not shown in the figure). The determining module may alternatively be replaced with a processor. The receiving module 901 is further configured to: after the sending module 902 sends the random access request to the base station, receive a random access response returned by the base station. The random access response includes a plurality of random backoff indicators corresponding to the plurality of random access groups. The determining module is configured to: determine a corresponding random access group based on a random access event, and select, based on the determined random access group, a corresponding random backoff indicator from the plurality of random backoff indicators corresponding to the plurality of random access groups.

Figure 10:
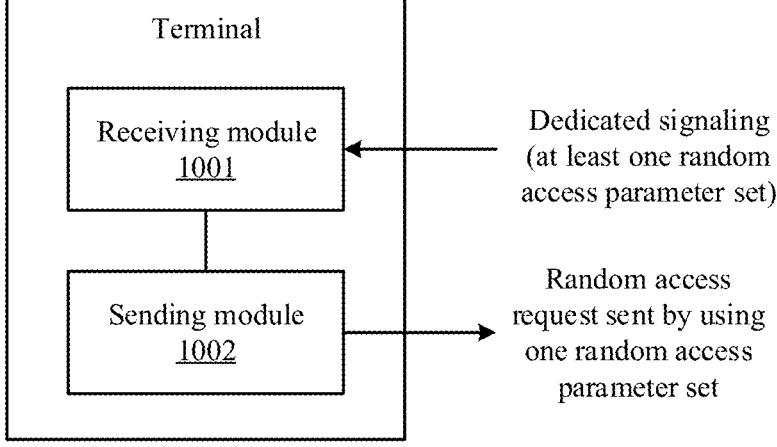

Based on a same technical conception, an embodiment of this application further provides a terminal. FIG. 10 shows an example of a structure of the terminal. The terminal may perform the procedure implemented on a terminal side in the procedure shown in FIG. 6. The terminal may include a receiving module 1001 and a sending module 1002. The sending module 1002 may be a transmitter, configured to send information. The receiving module 1001 may be a receiver, configured to receive information. In an example, the sending module 1002 may be a wireless signal transmitter, configured to send a wireless signal, and the receiving module 1001 may be a wireless signal transmitter, configured to transmit a wireless signal. Further, the sending module 1002 and the receiving module 1001 may be connected to a processor (not shown in the figure). The receiving module may send received information to the processor for processing, and the sending module may send the information processed by the processor.

The sending module 1002 is configured to: when the terminal is in a connected mode or an inactive mode, receive at least one random access parameter set sent by a base station by using dedicated signaling. The sending module 1002 is configured to: when the terminal is in a connected mode or an inactive mode, send a random access request to the base station by using one of the at least one random access parameter set. The random access parameter set includes monitoring start time and/or a time window size of a random access response time window:

Optionally, the terminal further includes a determining module (not shown in the figure). The determining module may alternatively be replaced with a processor. The random access parameter set further includes a random access preamble sequence. The random access request includes the random access preamble sequence. The determining module is configured to determine a corresponding random access parameter set based on a logical channel or a logical channel group used for to-be-sent uplink data and/or signaling. The sending module is specifically configured to send the random access preamble sequence in the random access parameter set to the base station based on the determined random access parameter set.

Optionally, the terminal further includes a determining module (not shown in the figure). The determining module may alternatively be replaced with a processor. The receiving module is further configured to: after the sending module sends the random access request to the base station, receive a random access response returned by the base station. The random access response includes a plurality of random backoff indicators corresponding to the plurality of random access groups, logical channels, or logical channel groups. The determining module is configured to: determine a corresponding random access group, logical channel, or logical channel group based on a random access event, and select a corresponding random backoff indicator from the plurality of random backoff indicators based on the determined random access group, logical channel, or logical channel group.

Optionally, the at least one random access parameter set is one random access parameter set. Alternatively, the at least one random access parameter set is a plurality of random access parameter sets corresponding to a plurality of random access groups. One or more random access groups correspond to one random access parameter set. The plurality of random access groups correspond to a PLMN accessed by the terminal in a connected mode or an inactive mode. Alternatively, the at least one random access parameter set is a random access parameter set corresponding to a plurality of logical channels or logical channel groups. One or more logical channels or logical channel groups correspond to one random access parameter set.

Optionally, the random access parameter set further includes one or any combination of the following parameters:

indication information of a random access preamble sequence;

indication information of a time-frequency resource occupied by the random access preamble sequence;

a timing time length of a contention resolution timer; and a maximum quantity of random access times.

Figure 11:
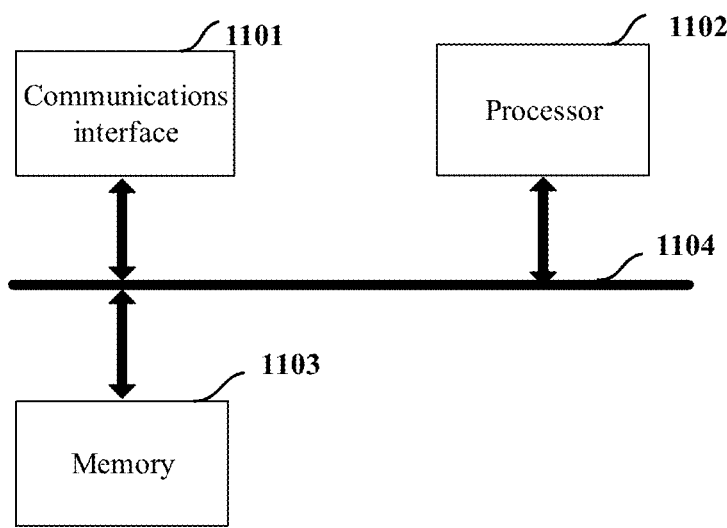
FIG. 11 shows an example of a schematic structural diagram of a base station according to another embodiment of this application.

Based on a same technical conception, an embodiment of this application further provides a base station. FIG. 11 shows an example of a structure of the base station.

As shown in FIG. 11, the network element includes a communications interface 1101, a processor 1102, and a memory 1103. The memory 1103 is configured to store program code that needs to be executed by the processor 1102. The communications interface 1101 performs message exchange. The processor 1102 is configured to execute the program code stored in the memory, and is specifically configured to perform the method performed on the base station side in the foregoing embodiment.

The processor 1102 may be a central processing module (central processing unit, CPU for short), a digital processing module, or the like. The memory 1103 may be a non-volatile memory such as a hard disk drive (HDD) or a solid-state drive (SSD), or may be a volatile memory such as a random-access memory (RAM). The memory 1103 is any other medium that can be used to carry or store desired program code in a form of an instruction or a data structure and that can be accessed by a computer, but is not limited thereto.

In this embodiment of this application, a specific connection medium among the communications interface 1101, the processor 1102, and the memory 1103 is not limited. In this embodiment of this application, the memory 1103, the processor 1102, and the communications interface 1101 are connected by using a bus 1104 in FIG. 11. The bus is represented by using a thick line in FIG. 11. A manner of connection between other components is merely an example for description, and imposes no limitation. The bus may be classified into an address bus, a data bus, a control bus, and the like. For ease of representation, only one thick line is used to represent the bus in FIG. 11, but this does not mean that there is only one bus or only one type of bus.

Figure 12:
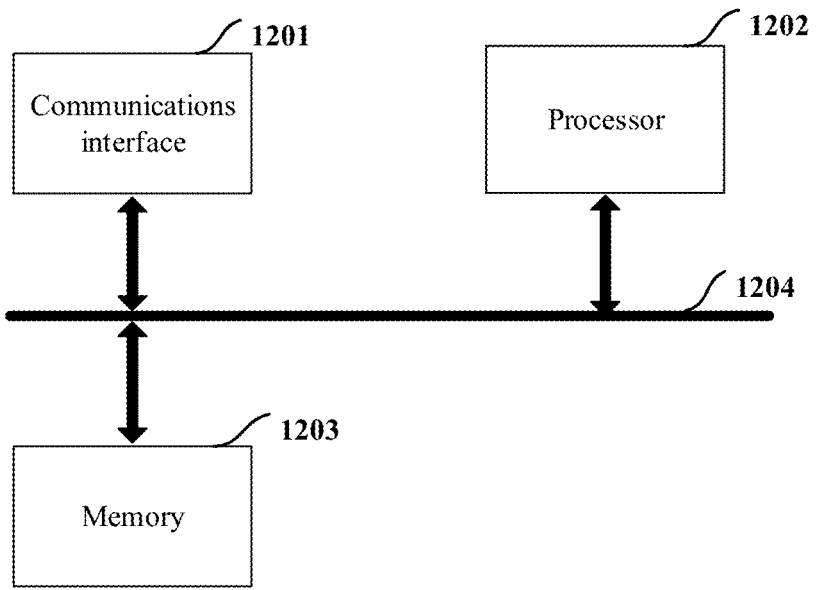
FIG. 12 shows an example of a schematic structural diagram of a terminal according to another embodiment of this application.

Based on a same technical conception, an embodiment of this application further provides a terminal. FIG. 12 shows an example of a structure of the terminal.

As shown in FIG. 12, the network element includes a communications interface 1201, a processor 1202, and a memory 1203. The memory 1203 is configured to store program code that needs to be executed by the processor 1202. The communications interface 1201 performs message exchange. The processor 1202 is configured to execute the program code stored in the memory, and is specifically configured to perform the method performed on the terminal side in the foregoing embodiment.

The processor 1202 may be a central processing module (central processing unit, CPU for short), a digital processing module, or the like. The memory 1203 may be a non-volatile memory such as a hard disk drive (HDD) or a solid-state drive (SSD), or may be a volatile memory such as a random-access memory (RAM). The memory 1203 is any other medium that can be used to carry or store desired program code in a form of an instruction or a data structure and that can be accessed by a computer, but is not limited thereto.

In this embodiment of this application, a specific connection medium among the communications interface 1201, the processor 1202, and the memory 1203 is not limited. In this embodiment of this application, the memory 1203, the processor 1202, and the communications interface 1201 are connected by using a bus 1204 in FIG. 12. The bus is represented by using a thick line in FIG. 12. A manner of connection between other components is merely an example for description, and imposes no limitation. The bus may be classified into an address bus, a data bus, a control bus, and the like. For ease of representation, only one thick line is used to represent the bus in FIG. 12, but this does not mean that there is only one bus or only one type of bus.

An embodiment of the present invention further provides a computer readable storage medium, configured to store a computer software instruction used to execute operations that need to be executed by the processor. The computer software instruction includes a program used to execute the operations that need to be executed by the processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The invention claimed is:

1. A communication method, comprising:

receiving, by a terminal, at least one random access parameter set from a base station;

sending, by the terminal, a random access request to the base station using one random access parameter set of the at least one random access parameter set;

wherein the terminal selects the one random access parameter set based on a random access event;

wherein one or more random access groups correspond to one random access parameter set, one random access group of the one or more random access groups corresponds to a network slice, and the one random access group is selected based on the random access event; and wherein the one random access parameter set of the at least one random access parameter set comprises a maximum quantity of random access times, and the one random access parameter set of the at least one random access parameter set is selected based on a network slice identifier.

2. The communication method of claim 1, wherein the receiving, by a terminal, at least one random access parameter set from a base station, comprises:

receiving, by the terminal, a plurality of random access parameter sets sent from the base station using a broadcast message.

3. The communication method of claim 1, wherein the receiving, by a terminal, at least one random access parameter set from a base station, comprises:

receiving, by the terminal, a plurality of random access parameter sets sent from the base station using dedicated signaling.

4. The communication method of claim 1, wherein the one random access group corresponds to a random backoff time coefficient, the random backoff time coefficient is greater than 0 and less than 1, and a random backoff time corresponding to the one random access group is obtained through calculation in the following manner: using a random backoff indicator included in a media access control-control element (MAC CE) as a reference value, and multiplying a random access time coefficient corresponding to the random access group.

5. The method according to claim 1, wherein the one random access parameter set further comprises one or any combination of the following parameters:

indication information of a random access preamble sequence;

indication information of a time-frequency resource occupied by the random access preamble sequence;

a timing time length of a contention resolution timer; and a scheduling message size threshold.

6. The communication method of claim 1, wherein the network slice identifier includes a single management-network slice selection assistance information (S-NSSAI).

7. A communication apparatus, comprising: at least one processor, wherein the at least one processor is coupled to at least one memory storing programming instructions executable by the at least one processor to perform operations comprising:

receiving at least one random access parameter set from a base station;

sending a random access request to the base station using one random access parameter set of the at least one random access parameter set;

wherein the terminal selects the one random access parameter set based on a random access event;

wherein one or more random access groups correspond to one random access parameter set, one random access group of the one or more random access groups corresponds to a network slice, and the one random access group is selected based on the random access event; and wherein the one random access parameter set of the at least one random access parameter set comprises a maximum quantity of random access times, and the one random access parameter set of the at least one random access parameter set is selected based on a network slice identifier.

8. The communication apparatus according to claim 7, wherein the operations further comprise:

receiving a plurality of random access parameter sets sent from the base station using a broadcast message.

9. The communication apparatus according to claim 7, wherein the operations further comprise:

receiving a plurality of random access parameter sets sent from the base station using dedicated signaling.

10. The communication apparatus according to claim 7, wherein the one random access group corresponds to a random backoff time coefficient, the random backoff time coefficient is greater than 0 and less than 1, and a random backoff time corresponding to the one random access group is obtained through calculation in the following manner: using the random backoff indicator included in a media access control-control element (MAC CE) as a reference value, and multiplying a random access time coefficient corresponding to the random access group.

11. The communication apparatus according to claim 7, wherein the one random access parameter set further comprises one or any combination of the following parameters:

indication information of a random access preamble sequence;

indication information of a time-frequency resource occupied by the random access preamble sequence;

a timing time length of a contention resolution timer; and a scheduling message size threshold.

12. The communication apparatus of claim 7, wherein the network slice identifier includes a single management-network slice selection assistance information (S-NSSAI).

13. A communication apparatus, comprising: at least one processor, wherein the at least one processor is coupled to at least one memory storing programming instructions executable by the at least one processor to perform operations comprising:

sending at least one random access parameter set to a terminal;

receiving a random access request from the terminal using one random access parameter set of the at least one random access parameter set;

wherein the terminal selects the one random access parameter set based on a random access event;

wherein one or more random access groups correspond to one random access parameter set, one random access group of the one or more random access groups corresponds to a network slice, and the one random access group is selected based on the random access event; and wherein the one random access parameter set of the at least one random access parameter set comprises a maximum quantity of random access times, and the one random access parameter set of the at least one random access parameter set is selected based on a network slice identifier.

14. The communication apparatus according to claim 13, wherein the operations further comprise:

sending a plurality of random access parameter sets to the terminal using a broadcast message.

15. The communication apparatus according to claim 13, wherein the operations further comprise:

sending a plurality of random access parameter sets to the terminal using dedicated signaling.

16. The communication apparatus according to claim 13, wherein the one random access group corresponds to a random backoff time coefficient, the random backoff time coefficient is greater than 0 and less than 1, and a random backoff time corresponding to the one random access group is obtained through calculation in the following manner: using the random backoff indicator included in a media access control-control element (MAC CE) as a reference value, and multiplying a random access time coefficient corresponding to the random access group.

17. The communication apparatus according to claim 13, wherein the one random access parameter set further comprises one or any combination of the following parameters:

indication information of a random access preamble sequence;

indication information of a time-frequency resource occupied by the random access preamble sequence;

a timing time length of a contention resolution timer; and a scheduling message size threshold.

18. The communication apparatus of claim 13, wherein the network slice identifier includes a single management-network slice selection assistance information (S-NSSAI).

\* \* \* \* \*